(12) United States Patent
Teman et al.

(10) Patent No.: US 12,498,854 B2
(45) Date of Patent: Dec. 16, 2025

(54) PHYSICALLY-DRIVEN GENERATION OF MANY-PORTED STORAGE ARRAYS

(71) Applicant: Bar-Ilan University, Ramat Gan (IL)

(72) Inventors: Adam Teman, Tel Mond (IL); Hanan Marinberg, Petach Tikva (IL); Tzachi Noy, Mazkeret Batya (IL)

(73) Assignee: Birad—Research & Development Company Ltd., Ramat Gan (IL)

( * ) Notice: Subject to any disclaimer, the term of this patent is extended or adjusted under 35 U.S.C. 154(b) by 209 days.

(21) Appl. No.: 18/350,145

(22) Filed: Jul. 11, 2023

(65) Prior Publication Data

US 2025/0021230 A1   Jan. 16, 2025

(51) Int. Cl.
  *G11C 16/04*  (2006.01)
  *G06F 3/06*  (2006.01)

(52) U.S. Cl.
  CPC ............ *G06F 3/061* (2013.01); *G06F 3/0638* (2013.01); *G06F 3/0683* (2013.01)

(58) Field of Classification Search
  CPC ....... G06F 3/061; G06F 3/0638; G06F 3/0683
  See application file for complete search history.

(56) References Cited

U.S. PATENT DOCUMENTS

| | | | | |
|---|---|---|---|---|
| 5,448,522 A | * | 9/1995 | Huang | G11C 8/16 |
| | | | | 365/230.01 |
| 6,188,633 B1 | * | 2/2001 | Naffziger | G11C 8/14 |
| | | | | 365/189.04 |
| 8,514,634 B1 | * | 8/2013 | Wu | G11C 11/419 |
| | | | | 365/189.04 |

* cited by examiner

*Primary Examiner* — Pho M Luu

(74) *Attorney, Agent, or Firm* — Dekel Patent Ltd.; David Klein

(57) ABSTRACT

A method for using a storage array of a circuit includes generating a netlist of components and connections of circuitry of a storage array using behavioral description and random logic synthesis, using a write port to clock-gate each register of the storage array, and multiplexing data based on a selected word line of the storage array.

18 Claims, 4 Drawing Sheets

| Write Mux 4:1 (WP11:8) | Secondary Write Mux 4:1 (Wpselect 1:0) | Latch | | RP1 Level1 | RP1 Level i |
|---|---|---|---|---|---|
| Write Mux 4:1 (WP7:4) | Write Mux 4:1 (WP3:0) | RP3 Level1 | RP3 Level i | RP2 Level1 | RP2 Level i |

PHYSICALLY-DRIVEN GENERATION OF MANY-PORTED STORAGE ARRAYS

FIELD OF THE INVENTION

The present invention relates generally to memory circuitry with multi-ported operation with storage arrays, and particularly to methods for physically-driven generation of many-ported storage arrays.

BACKGROUND OF THE INVENTION

While embedded memory remains a major bottleneck in current integrated circuit design in terms of silicon area, power dissipation, and performance, static random access memories (SRAMs) are almost exclusively supplied by a small number of vendors through memory generators, targeted at rather generic design specifications. As an alternative, standard cell memories (SCMs) can be defined, synthesized and placed and routed as an integral part of a given digital system, providing complete design flexibility, good energy efficiency, low-voltage operation, and even area efficiency for small memory blocks. In addition, when generating tightly coupled storage arrays, the use of SCMs is very common, due to their high speed and their flexibility to support complex features, such as multi-ported operation. This is commonly done by describing the storage array as part of the behavioral register-transfer level (RTL) description of a digital system, which is then passed down to the physical implementation just as any other piece of random logic. However, implementing an SCM block from an RTL description with a standard digital flow often fails to exploit the distinct and regular structure of such an array or cannot generate the desirable low power circuit features, leaving room for optimization.

Many systems and applications require multi-ported memories, which support multiple write and/or read operations in parallel. Common examples of these include first-in first-out (FIFO) buffers, require independent write (push) and read (pop) operations, and processor storage arrays, which often apply register-register instructions, such as adding two registers and storing the result, which requires a 2R1W (two simultaneous reads and one write operation) memory. Other applications require many more ports. For example, a dual-issue processor would require doubling the number of simultaneous reads and writes. Unfortunately, standard SRAMs are only single-ported (1RW) and more advanced vendor provided SRAM compilers usually support no more than two-ported (2RW) operation. Therefore, when higher degrees of multi-ported memories are required, either complex custom circuit implementations are required or SCMs that are generated from RTL code through automatic synthesis are used.

Certain applications take this concept to an extreme. Most digital signal processing (DSP) systems support single-instruction multiple-data (SIMD) vector operations, which apply computation to many values at once. This can lead to the need for a high number of both read and write ports. In some reported DSP IPs, as many as 20 read and 20 write ports are required for the implementation of a vector storage array (VRF). In such cases, SRAM based solutions cannot be robustly expanded to support these features, and so these are described almost exclusively in RTL and implemented as part of the standard digital flow. However, this high-level description does not automatically translate into an optimized netlist that and the pre-known features of these components and the physical implementation algorithms are not tuned to exploit their specific structural properties. Furthermore, the complexity of the high degree of multiplexing required to implement the logic results in very poor utilization, high run times, and poor performance due to routing complexity.

SUMMARY OF THE INVENTION

The present invention seeks to provide methods for physically-driven generation of many-ported storage arrays based on digital library cells, as is described more in detail hereinbelow. These approaches lead to an efficient implementation of these storage arrays, providing lower area, better performance, lower power and reduced tool run times. Without limitation, some of the inventive features include:

1) Automatic netlist generation according to predefined structure, rather than behavioral description and random logic synthesis.
2) A novel write port which clock gates the registers and multiplexes the data based on the selected word line. The write port can be made with an ANDing approach or a priority encoder approach.
3) A read port based on tightly placed column decoding or propagation of a single read signal to output multiplexers.
4) A controlled placement approach that defines the placement of each bit and its ports or alternatively fences the area for the bits and allows standard algorithms to decide on the particular placement within the guided area.
5) An option to enable scan (ATPG-Automatic Test Pattern Generation) testing into the storage array
6) An option to enable reset, including fine-grained reset into the storage array
7) An option to generate and automatically distribute and place buffer trees for high fan-out nets within the array There is provided in accordance with an embodiment of the invention a method for using a storage array of a circuit including generating a netlist of components and connections of circuitry of a storage array using behavioral description and random logic synthesis, using a write port to clock-gate each register of the storage array, and multiplexing data based on a selected word line of the storage array.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Figure 1:
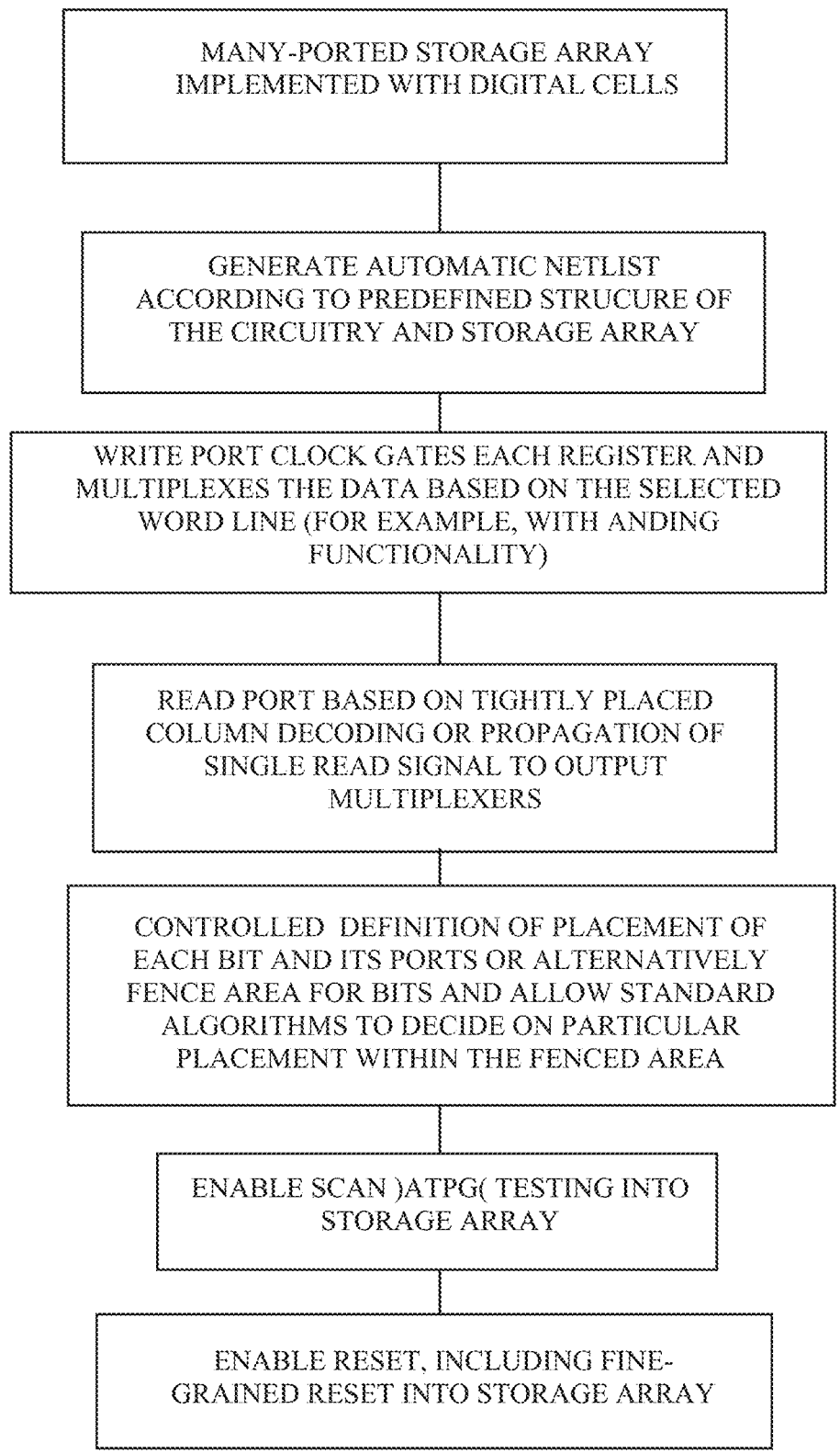
FIG. 1 is a simplified flow chart of a method for physically-driven generation of many-ported storage arrays based on digital library cells, in accordance with a non-limiting embodiment of the invention.

Reference is now made to FIG. 1, which illustrates a simplified flow chart of a method for physically-driven generation of many-ported storage arrays based on digital library cells, in accordance with a non-limiting embodiment of the invention.

As opposed to the prior art, which generates netlists of the components and connections of the circuitry of the storage array using behavioral or RTL description and random logic synthesis, the present invention automatically generates the netlist according to the predefined structure of the digital cells of the storage array.

In the circuitry of the present invention, the write port clock gates each register and multiplexes the data based on the selected word line. The write port can be made with ANDing logic circuitry or with a priority encoder approach.

It is noted that in the implementation of the write port, instead of clocking the registers, the clock is gated according to the selected word line that comes out of the decoder. The clock is enabled if any write port is enabled and the data is either based on priority or an AND between word line and data in. Both of these possibilities assume that only one port is allowed to write to a given address during a given cycle, otherwise the choice of which data is written is arbitrary. This feature enables compressing the circuit and saving power.

Figure 2:
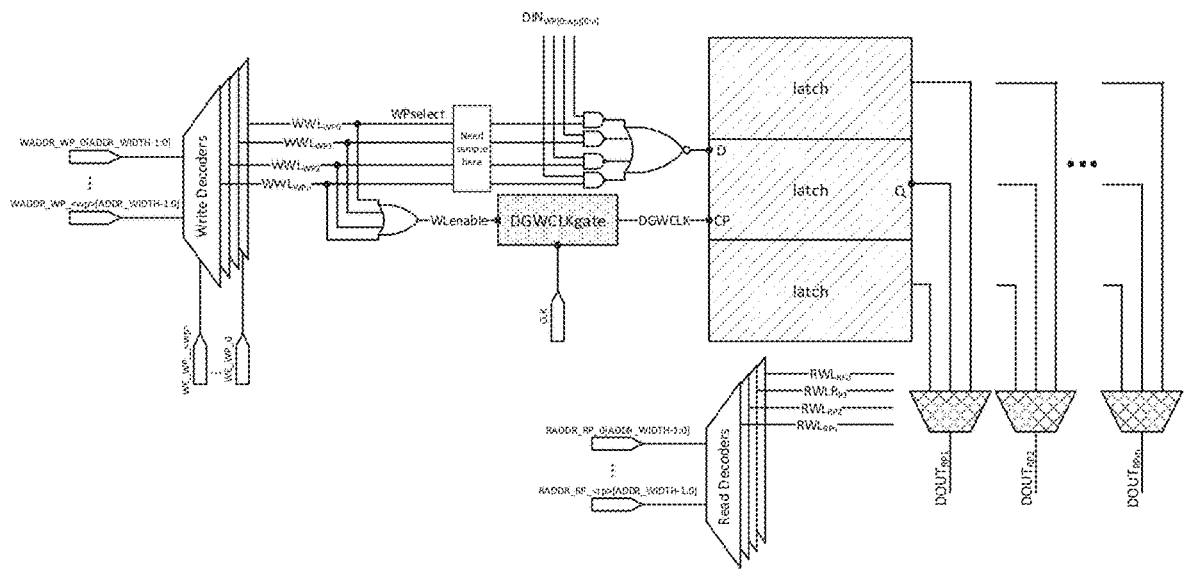
FIG. 2 is a schematic illustration of a circuit for implementing the method of FIG. 1, including a write port with an ANDing approach which clock gates the registers and multiplexes the data based on the selected word line and having a latch-based storage, in accordance with a non-limiting embodiment of the invention.
Figure 3:
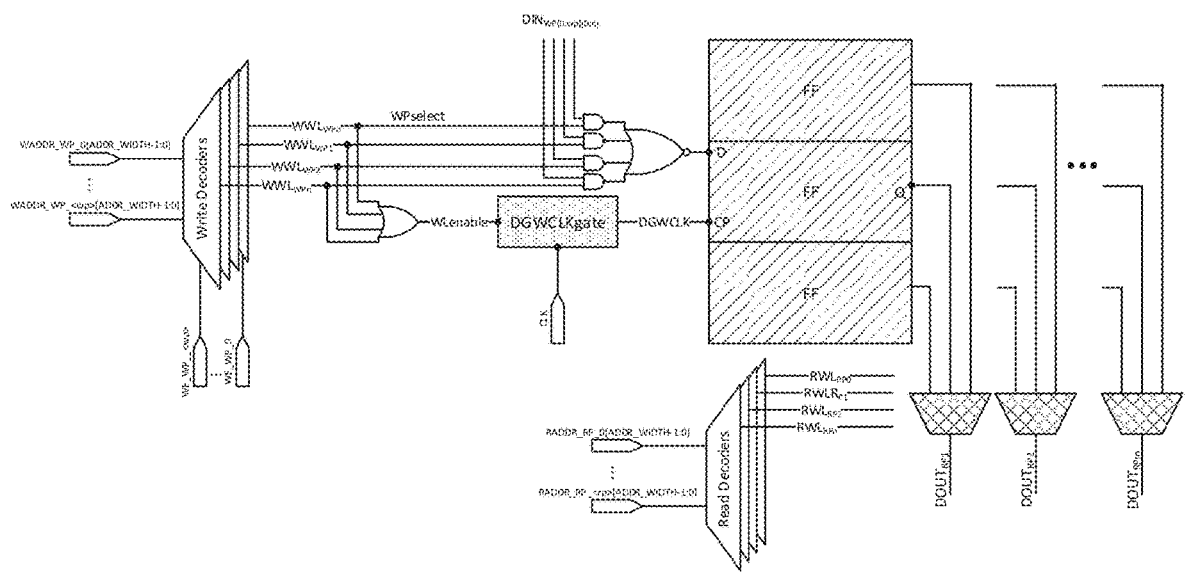
FIG. 3 is a schematic illustration of a circuit for implementing the method of FIG. 1, including a write port with an ANDing approach which clock gates the registers and multiplexes the data based on the selected word line and having a flip-flop storage, in accordance with a non-limiting embodiment of the invention.
Figures 4, 5:
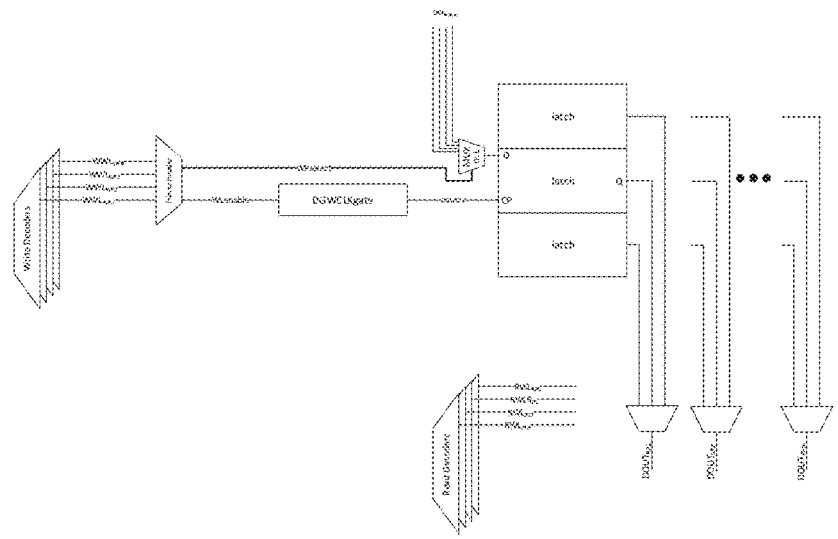
FIG. 4 is a schematic illustration of a circuit for implementing the method of FIG. 1 including a write port with an ANDing approach which clock gates the registers and multiplexes the data based on the selected word line and having a latch-based storage (with a multiplexer inputting into the latches instead of a logic (e.g., NOR) gate as in FIG. 2 or 3), in accordance with yet another non-limiting embodiment of the invention.
FIG. 5 is a block diagram of a controlled placement scheme which may be used in the method of FIG. 1, in accordance with a non-limiting embodiment of the invention.
Figure 6:
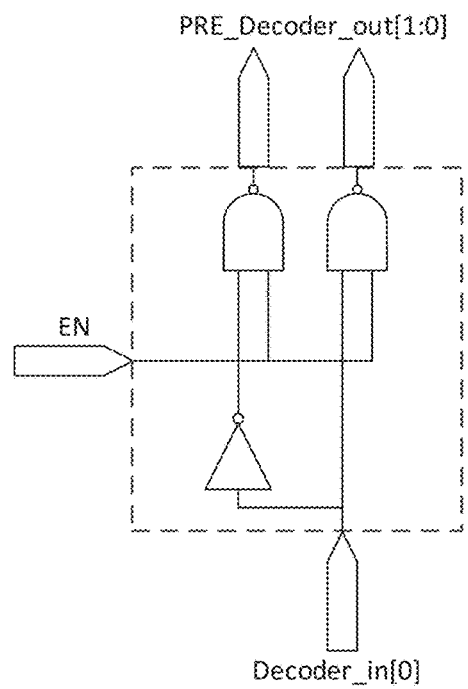
FIG. 6 is a schematic illustration of a decoder circuit which may be used in the method of FIG. 1, in accordance with a non-limiting embodiment of the invention.

In the circuitry of the present invention, the read port is based on tightly placed column decoding or propagation of a single read signal to output multiplexers. Examples of suitable circuitry for the write port and read port are shown in FIGS. 2-4. An example of controlled placement is shown in FIG. 5. An example of a decoder circuit for use in the circuitry of FIGS. 2-4 is shown in FIG. 6.

In one embodiment, the invention may use a controlled placement approach that defines the placement of each bit and its ports or alternatively fences the area for the bits and allows standard algorithms to decide on the particular placement within the fenced area.

Figure 7:
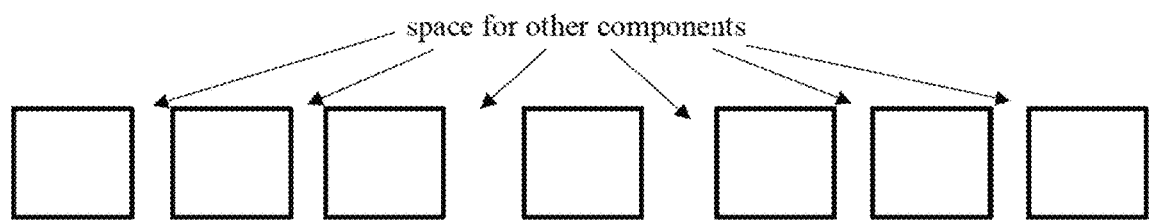
FIG. 7 is a block diagram of a controlled placement of a buffer tree for high fan-out nets that may be used in either horizontal or vertical orientation in the method of FIG. 1, in accordance with a non-limiting embodiment of the invention

In one embodiment, the invention may optionally include buffer trees for high fan-out nets such as, but not limited to the word lines which may be placed tightly as shown in FIG. 7 either in dedicated spaces or interleaved between other components in a horizontal or vertical manner.

In one embodiment, the invention may optionally enable scan (e.g., ATPG) testing into the storage array. In another option, the invention may enable reset functionality, including fine-grained reset into the storage array.

The methods of the invention lead to an efficient implementation of the storage arrays, reduce footprint area, improve performance, reduce power and reduce tool run times.

What is claimed is:

1. A method for using a storage array of a circuit comprising:
generating a netlist of components and connections of circuitry of a storage array using behavioral description and random logic synthesis, said storage array having at least one read port;
using at least one write port to clock-gate each register of said storage array; and
multiplexing data based on a selected word line of said storage array, and wherein said at least one write port comprises a priority encoder.

2. The method according to claim 1, wherein said at least one write port comprises ANDing logic circuitry.

3. The method according to claim 1, wherein said at least one read port is based on tightly placed column decoding.

4. The method according to claim 1, wherein said at least one read port is based on propagation of a single read signal to output multiplexers.

5. The method according to claim 1, comprising using controlled placement to define placement of each bit and its ports in said storage array.

6. The method according to claim 1, comprising defining a fenced area for bits and defining particular placements of each of the bits within the fenced area.

7. The method according to claim 1, further comprising scan testing into said storage array.

8. The method according to claim 1, further comprising reset functionality in said storage array.

9. The method according to claim 1, wherein said at least one write port comprises multiple write ports that are integrated simultaneously with said storage array, and independently and exclusively written to with selected data.

10. The method according to claim 1, wherein said at least one write port comprises multiple write ports and each of said write ports are enabled separately, and clock gated if not enabled, wherein a general clock gating is applied if no write port is enabled.

11. The method according to claim 1, wherein said at least one read port comprises multiple read ports that are integrated simultaneously with said storage array, and data is independently read out through each of said read ports.

12. The method according to claim 1, wherein read data is supplied to an output asynchronously or following one or more synchronous clock edges.

13. The method according to claim 1, wherein library cells used to implement all components of said storage array are selected from a set of given cells based on an automated optimization algorithm for optimizing area, performance or power.

14. The method according to claim 1, comprising generating the storage array with all its components and placement features based on a set of predefined options.

15. The method according to claim 1, wherein said at least one high fan-out net features a buffer tree that is tightly place.

16. The method according to claim 1, comprising repeating generation of multiple candidate netlists with different drive strength choices for the netlist of components followed by an analysis of figures of merit of said candidate netlists and a selection of at least one of said candidate netlists with desired properties.

17. A method for using a storage array of a circuit comprising:
   generating a netlist of components and connections of circuitry of a storage array using behavioral description and random logic synthesis, said storage array having at least one read port;
   using at least one write port to clock-gate each register of said storage array; and
   multiplexing data based on a selected word line of said storage array, and wherein said at least one read port is based on tightly placed column decoding.

18. A method for using a storage array of a circuit comprising:
   generating a netlist of components and connections of circuitry of a storage array using behavioral description and random logic synthesis, said storage array having at least one read port;
   using at least one write port to clock-gate each register of said storage array; and multiplexing data based on a selected word line of said storage array; and
   generating the storage array with all its components and placement features based on a set of predefined options.

\* \* \* \* \*